United States Patent
Kenoyer et al.

(10) Patent No.: US 7,602,141 B2
(45) Date of Patent: Oct. 13, 2009

(54) BATTERY OPERATED SPEAKERPHONE AND CHARGING STAND

(75) Inventors: Michael L. Kenoyer, Austin, TX (US); Simon Dudley, Brighton (GB)

(73) Assignee: LifeSize Communications, Inc., Austin, TX (US)

( * ) Notice: Subject to any disclaimer, the term of this patent is extended or adjusted under 35 U.S.C. 154(b) by 504 days.

(21) Appl. No.: 11/252,225

(22) Filed: Oct. 17, 2005

(65) Prior Publication Data

US 2006/0093151 A1 May 4, 2006

Related U.S. Application Data

(60) Provisional application No. 60/634,315, filed on Dec. 8, 2004, provisional application No. 60/619,303, filed on Oct. 15, 2004.

(51) Int. Cl.
   *H02J 7/00* (2006.01)
(52) U.S. Cl. .................. 320/107; 320/113; 320/115
(58) Field of Classification Search .............. 320/107, 320/110, 114, 115, 103, 109, 113; 324/432
   See application file for complete search history.

(56) References Cited

U.S. PATENT DOCUMENTS

| | | | |
|---|---|---|---|
| 5,239,623 A | | 8/1993 | Sato et al. |
| 5,382,972 A | | 1/1995 | Kannes |
| 5,515,099 A | | 5/1996 | Cortjens et al. |
| 5,544,784 A | * | 8/1996 | Malaspina ............... 221/135 |
| 5,555,965 A | * | 9/1996 | Mishina .................. 194/217 |
| 5,581,671 A | | 12/1996 | Goto et al. |
| 5,605,249 A | * | 2/1997 | Gonyea ..................... 221/6 |
| 5,617,539 A | | 4/1997 | Ludwig et al. |
| 5,689,641 A | | 11/1997 | Ludwig et al. |
| 5,751,338 A | | 5/1998 | Ludwig, Jr. |
| 5,951,229 A | * | 9/1999 | Hammerslag ............. 414/398 |
| 5,973,476 A | * | 10/1999 | Irvin ...................... 320/112 |
| 6,049,192 A | * | 4/2000 | Kfoury et al. ............. 320/113 |

(Continued)

OTHER PUBLICATIONS

"A history of video conferencing (VC) technology" http://web.archive.org/web/20030622161425/http://myhome.hanafos.com/~soonjp/vchx.html (web archive dated Jun. 22, 2003); 5 pages.

(Continued)

*Primary Examiner*—Akm E Ullah
*Assistant Examiner*—Arun Williams
(74) *Attorney, Agent, or Firm*—Meyertons Hood Kivlin Kowert & Goetzel, P.C.; Jeffrey C. Hood

(57) ABSTRACT

In various embodiments, to avoid having to plug in the speakerphone, the speakerphone may be powered with a battery. In some embodiments, the speakerphone may exchange a discharged battery with a charged battery on a charging stand. In some embodiments, a charging stand, with a battery releasably coupled to the charging stand, may be configured to receive a second battery from a speakerphone. In some embodiments, the speakerphone with the first battery may be placed onto the charging stand to engage the charging stand. The charging stand may determine if the first battery on the speakerphone needs to be exchanged (e.g., if it is charged below a predetermined limit). If the battery needs to be exchanged, the charging stand may exchange the first battery with the second battery by disengaging the first battery and engaging the second battery with the speakerphone.

17 Claims, 7 Drawing Sheets

U.S. PATENT DOCUMENTS

| | | | |
|---|---|---|---|
| 6,128,649 | A | 10/2000 | Smith et al. |
| 6,195,184 | B1 | 2/2001 | Chao et al. |
| 6,281,882 | B1 | 8/2001 | Gordon et al. |
| 6,314,211 | B1 | 11/2001 | Kim et al. |
| 6,356,054 | B1* | 3/2002 | Herrmann .................. 320/115 |
| 6,400,996 | B1 | 6/2002 | Hoffberg et al. |
| 6,509,715 | B1* | 1/2003 | LaRue ....................... 320/107 |
| 6,594,688 | B2 | 7/2003 | Ludwig et al. |
| 6,813,083 | B2 | 11/2004 | Kobayashi |
| 6,816,740 | B2* | 11/2004 | Lin ............................ 455/573 |
| 6,816,904 | B1 | 11/2004 | Ludwig et al. |
| 6,909,552 | B2 | 6/2005 | Dohi et al. |
| 6,944,259 | B2 | 9/2005 | Yang |
| 6,967,321 | B2 | 11/2005 | Leong et al. |
| 7,133,062 | B2 | 11/2006 | Castles et al. |
| 2003/0218445 | A1* | 11/2003 | Behar ......................... 320/114 |
| 2004/0135541 | A1* | 7/2004 | Cho et al. ................... 320/107 |
| 2006/0093128 | A1* | 5/2006 | Oxford .................. 379/406.01 |
| 2007/0046254 | A1* | 3/2007 | Chen et al. .................. 320/107 |

OTHER PUBLICATIONS

"MediaMax Operations Manual"; May 1992; 342 pages; VideoTelecom; Austin, TX.

"MultiMax Operations Manual"; Nov. 1992; 135 pages; VideoTelecom; Austin, TX.

Ross Cutler, Yong Rui, Anoop Gupta, JJ Cadiz, Ivan Tashev, Li-Wei He, Alex Colburn, Zhengyou Zhang, Zicheng Liu and Steve Silverberg; "Distributed Meetings: A Meeting Capture and Broadcasting System"; Multimedia '02; Dec. 2002; 10 pages; Microsoft Research; Redmond, WA.

P. H. Down; "Introduction to Videoconferencing"; http://www.video.ja.net/intro/; 2001; 26 pages.

"Eye-to-Eye Video"; Retrieved from the Internet: http://itotd.com/articles/254/eye-to-eye-video/; Jul. 23, 2004; 6 pages.

"Free2C 3D-Display" (web archive: http://www.hhi.fraunhofer.de/english/im/products/Cebit/free2C/free2C.html dated Nov. 22, 2005); Fraunhofer Institute for Telecommunications; 4 pages.

"Guide to Videoconferencing"; 2005; 119 pages; University of Malta.

"MacSpeech Certifies Voice Tracker™ Array Microphone"; Apr. 20, 2005; 2 pages; MacSpeech Press.

"Videoconferencing Educational Technology—Basic Functions of the Polycom Remote Control Unit"; http://www.medlib.iupui.edu/techsupport/vc/vcinstructions.html; 2002; 3 pages.

E. J. Addeo, A.D. Gelman and A.B. Dayao; "Personal Multi-media Multi-point Communication Services for Broadband Networks", Global Telecommunications Conference and Exhibition; Nov.-Dec. 1988 pp. 53-57; vol. 1.

Ronald Baecker, Ian Small, and Richard Mander; "Bringing Icons to Life"; Conference on Human Factors in Computing Systems; 1991; 6 pages.

N. A. Dodgson, N.E. Wiseman, S.R. Lang, D.C. Dunn, and A.R.L. Travis; "Autostereoscopic 3D Display in Laparoscopic Surgery"; Jun. 1995; 5 pages; CAR '95 (Computer Assisted Radiology), Berlin.

Neil A. Dodgson, John R. Moore, and Stewart R. Lang; "Time-Multiplexed Autostereoscopic Camera System"; Proceedings of The International Society for Optical Engineering; May 1997; p. 12.

Jefferson Han and Brian Smith; "CU-SeeMe VR Immersive Desktop Teleconferencing"; Proceeding of the Fourth ACM international conference on Multimedia; 1997; pp. 199-207.

David McAllister; "Display Technology: Stereo & 3D Display Technologies" North Carolina University, http://web.archive.org/web/20031206213341/http://research.csc.ncsu.edu/stereographics/wiley.pdf (date or web archive Dec. 6, 2003); 50 pages.

Alexander Sawchuk, Isaac Cohen, Chris Kyriakakis, and Albert Rizzo; "Three Dimensional Interaction with Autostereoscopic Displays" (date unknown); 8 pages.

Lars Weinand; "3D Stereo Technology: Is it Ready for Prime Time?"; http://www.tomshardware.com/2005/05/02/3d_stereo_technology; May 2, 2005; 40 pages.

"Polycom Executive Collection"; Jun. 2003; 4 pages; Polycom, Inc.; Pleasanton, CA.

"Technical Handbook"; North Dakota Interactive Video Network; Jan. 2003; 38 pages.

* cited by examiner

```
┌─────────────────────┐
│ The speakerphone    │
│ with a first battery│
│ may be placed onto  │
│ a charging stand    │
│ with a second       │
│ battery.            │
│ 1001                │
└─────────┬───────────┘
          ▼
┌─────────────────────┐
│ The first battery   │
│ may be disengaged   │
│ from the            │
│ speakerphone.       │
│ 1003                │
└─────────┬───────────┘
          ▼
┌─────────────────────┐
│ The second battery  │
│ from a charging     │
│ stand may be        │
│ coupled to the      │
│ speakerphone.       │
│ 1005                │
└─────────────────────┘
```

*FIG. 10*

BATTERY OPERATED SPEAKERPHONE AND CHARGING STAND

PRIORITY CLAIM

This application claims benefit of priority of U.S. Provisional Patent Application Ser. No. 60/619,303 titled "Speakerphone", filed on Oct. 15, 2004, whose inventors are William V. Oxford, Michael L. Kenoyer, and Simon Dudley, which is hereby incorporated by reference in its entirety as though fully and completely set forth herein.

This application also claims benefit of priority of U.S. Provisional Patent Application No. 60/634,315 titled "Speakerphone", which was filed Dec. 8, 2004, whose inventors are William V. Oxford, Michael L. Kenoyer and Simon Dudley which is hereby incorporated by reference in its entirety as though fully and completely set forth herein.

BACKGROUND OF THE INVENTION

1. Field of the Invention

The present invention relates generally to phones and, more specifically, to speakerphones.

2. Description of the Related Art

Speakerphones are commonly used for communication between groups of people. For example, speakerphones may be placed on a central table with one or more individuals arranged around the speakerphone for a meeting with other groups also using a speakerphone. Because the speakerphone is often placed in the middle of a group of people, powering the speakerphone may present several problems. For example, power cords to the speakerphone may be cumbersome. Participants in the meeting may trip over the cords that often span between the central table and a wall outlet. In addition, the cords often run across the table. This may, for example, interfere with a writing surface on the central table for one or more participants. In addition, speakerphone cords may have a displeasing aesthetic appearance.

SUMMARY OF THE INVENTION

In various embodiments, the speakerphone may be powered with a battery to eliminate the need for a power cord. When the battery in the speakerphone becomes low on power, the battery may be exchanged for a charged battery. For example, the speakerphone may use a first battery while a charging stand charges a second battery. The charging stand may exchange the second battery for the first battery when the speakerphone engages the charging stand with a low powered first battery. In some embodiments, the second battery may be releasably coupled to the charging stand to assist in transfer to the speakerphone.

In some embodiments, the speakerphone, with the first battery, may be placed onto the charging stand. The charging stand or the speakerphone may determine if the first battery on the speakerphone needs to be exchanged (e.g., if it is powered below a predetermined limit). If the first battery needs to be exchanged, the charging stand may exchange the first battery with the second battery by disengaging the first battery from the speakerphone and engaging the second battery to the speakerphone. The first battery may then be charged by the charging stand for a subsequent exchange with the second battery when needed.

BRIEF DESCRIPTION OF THE DRAWINGS

A better understanding of the present invention may be obtained when the following detailed description is considered in conjunction with the following drawings, in which:

FIG. 10 illustrates a method for exchanging a battery on a speakerphone, according to an embodiment.

Figure 1A:
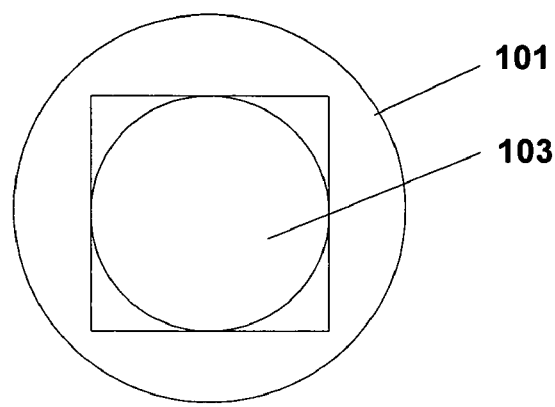
FIG. 1a illustrates a bottom view of a speakerphone with a single battery compartment, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. Provisional Patent Application titled "Video Conferencing Speakerphone", Ser. No. 60/619,212, which was filed Oct. 15, 2004, whose inventors are Michael L. Kenoyer, Craig B. Malloy, and Wayne E. Mock is hereby incorporated by reference in its entirety as though fully and completely set forth herein.

U.S. Provisional Patent Application titled "Video Conference Call System", Ser. No. 60/619,210, which was filed Oct. 15, 2004, whose inventors are Jonathan W. Tracey, Craig B. Malloy, Michael L. Kenoyer, Michael V. Jenkins, Ashish Goyal, and Michael J. Burkett, is hereby incorporated by reference in its entirety as though fully and completely set forth herein.

U.S. Provisional Patent Application titled "High Definition Camera and Mount", Ser. No. 60/619,227, which was filed Oct. 15, 2004, whose inventors are Michael L. Kenoyer, Patrick D. Vanderwilt, Paul D. Frey, Paul Leslie Howard, Jonathan I. Kaplan, and Branko Lukic, is hereby incorporated by reference in its entirety as though fully and completely set forth herein.

Figure 1B:
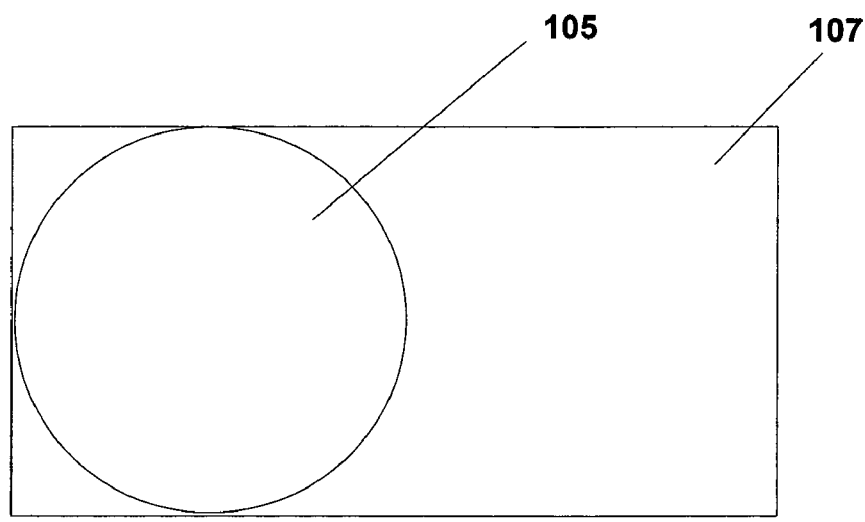
FIG. 1b illustrates a top view of a charging stand, according to an embodiment.
Figure 2:
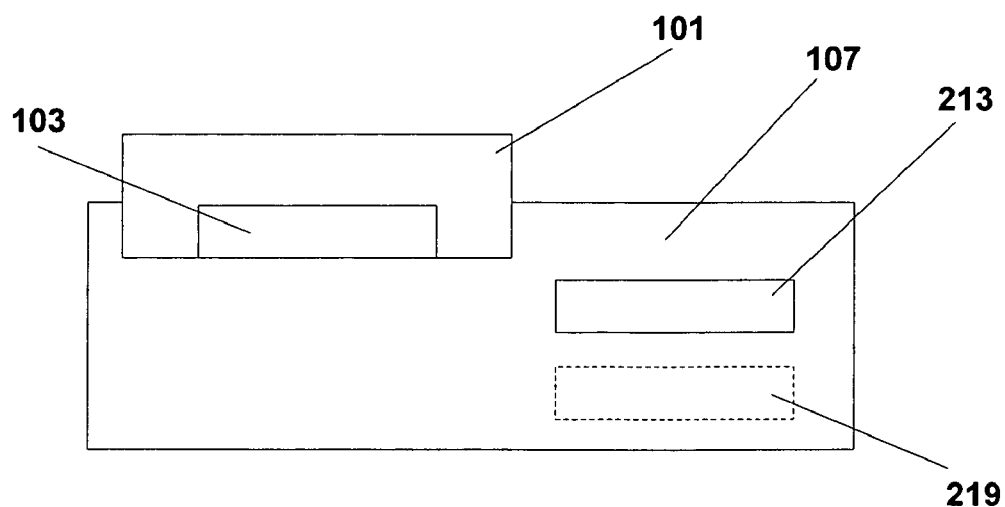
FIG. 2 illustrates a side view of a charging stand exchanging a battery with a speakerphone, according to an embodiment.

FIG. 1a illustrates a bottom view of an embodiment of a speakerphone with a single battery compartment. FIG. 1b illustrates a top view of an embodiment of a charging stand. FIG. 2 illustrates a side view of an embodiment of a charging stand exchanging a speakerphone battery. The speakerphone 101 may include a microphone for receiving audio from conference participants around the speakerphone 101. The speakerphone 101 may also have a speaker to reproduce the audio from a remote speakerphone 101. In some embodiments, the speakerphone 101 may be powered using a battery 103. The battery 103 may be a device that stores energy and provides that energy in the form of electrical energy. For example, the battery 103 may be a rechargeable battery such as a nickel-cadmium, nickel metal hydride, or lithium ion battery. In some embodiments, the battery 103 may not be rechargeable.

In some embodiments, the speakerphone 101 and charging stand 107 may be configured for quick exchange of batteries. In some embodiments, the speakerphone 101 and battery 103 may be placed into a speakerphone slot 105 of the charging stand 107. In some embodiments, the battery 103 may be round to eliminate rotational alignment issues when inserting the speakerphone 101 into the charging stand 107. Other battery shapes are also contemplated (e.g., square).

As seen in the side view (FIG. 2), battery 103 may be exchanged with a battery (e.g., battery 213) already present in the charging stand 107 using various internal guides and motors. When the speakerphone 101 is placed in the speakerphone slot 105, the internal battery 103 may be automatically removed from the speakerphone 101 and moved to an empty holding position (such as holding position 219) to be recharged.

In some embodiments, a charged battery 213 may be automatically moved into the speakerphone 101. In some embodiments, the process may take less than five seconds. In some embodiments, the speakerphone 101 may continue to operate while the batteries are being exchanged to minimize disruptions to a conference call. In some embodiments, the speakerphone 101 may indicate when remaining battery life is less than a designated amount (e.g., with an indicator on screen or by a flashing light) so the user may quickly swap batteries before or during a call. In some embodiments, the speakerphone 101 may be periodically placed on the charging stand and either the speakerphone or charging stand may determine whether the battery 103 needs to be exchanged (e.g., because it is low on power). The battery 103 may then be automatically exchanged. In some embodiments, the battery 213 in the charging stand 107 may be automatically charged to insure a charged battery is ready for exchange when needed.

Figure 3:
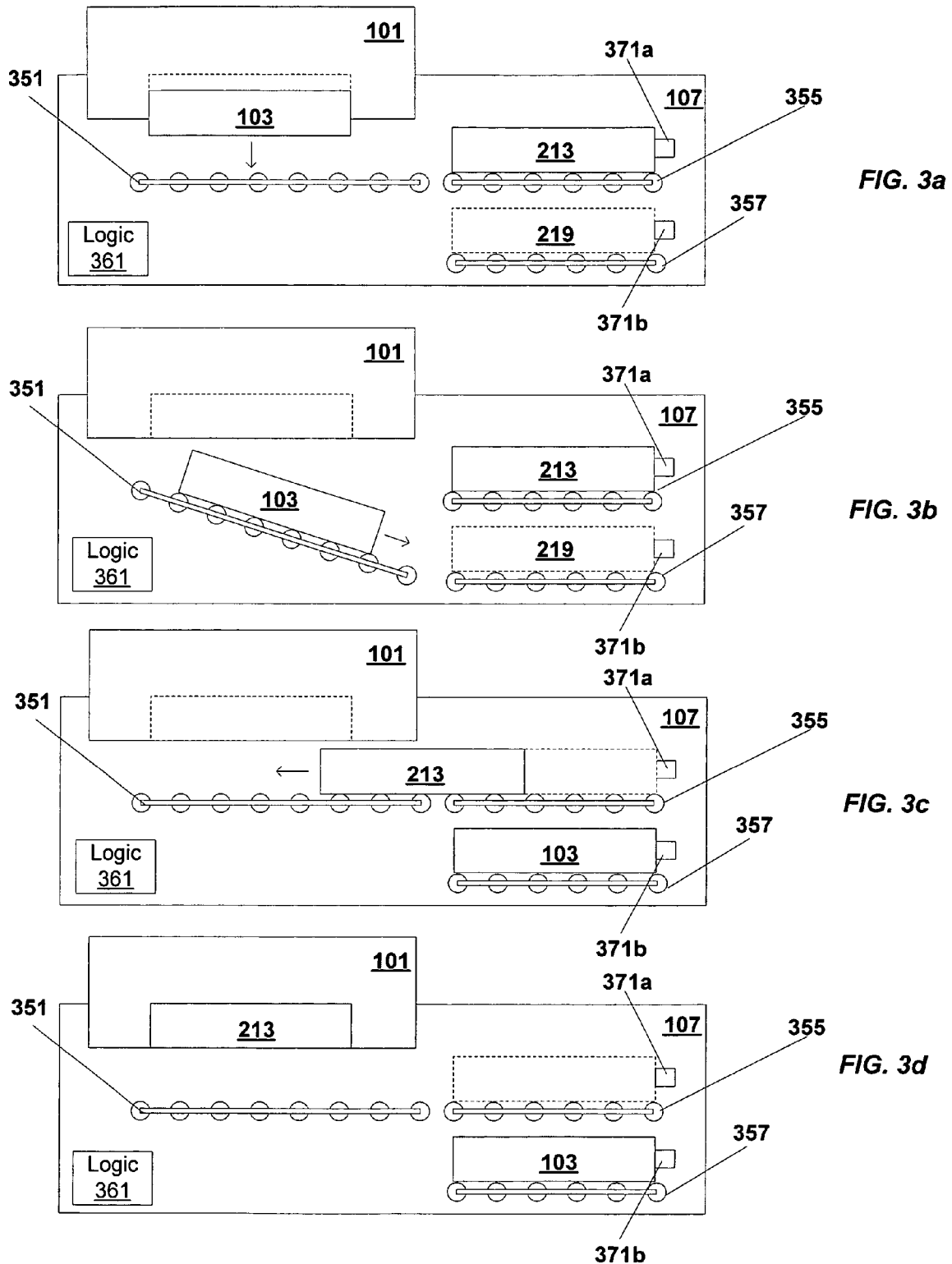
FIGS. 3a-3d illustrate an embodiment of the charging stand and speakerphone exchanging batteries.

FIGS. 3a-3d illustrate an embodiment of the charging stand 107 and speakerphone 101 exchanging batteries. In some embodiments, a series of rollers may be used to manipulate the batteries 103 and 213. For example, as seen in FIG. 3a, battery 103 may lower onto a series of rollers 351. The battery 103 may be released from the speakerphone 101 and lowered (by gravity) onto the rollers 351. In some embodiments, rollers 351 may raise up to contact the bottom of battery 103 prior to battery 103 being released from the speakerphone 101. In some embodiments, magnets may be used to manipulate battery 103 onto the rollers 351.

As seen in FIG. 3b, the rollers 351 may lower and/or rotate the battery 103 into empty charging slot 219. Rollers 357 may further rotate to position the battery 103 into the charging slot 219. In some embodiments, the battery 103 may engage a charging pin 371b to begin recharging.

As seen in FIG. 3c, charged battery 213 may be moved onto rollers 351 using rollers 355. As seen in FIG. 3d, the charged battery 213 may be received into speakerphone 101 (e.g., rollers 351 may raise up to engage the charged battery with the speakerphone). In some embodiments, the battery 213 may be held in the speakerphone by magnets or clips. Other fasteners are also contemplated. In some embodiments, logic 361 may control the actions of the rollers and/or other mechanisms used to manipulate the batteries. In some embodiments, the logic 361 may also determine whether the batteries need to be exchanged.

Figure 4:
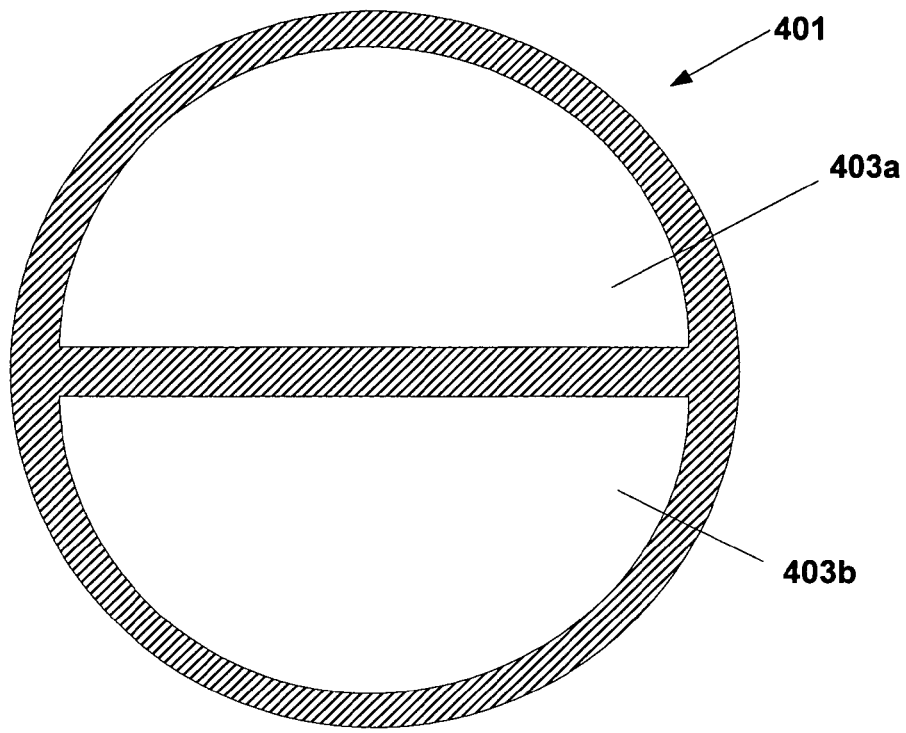
FIG. 4 illustrates a bottom view of a speakerphone with two speakerphone battery compartments, according to an embodiment.
Figure 5:
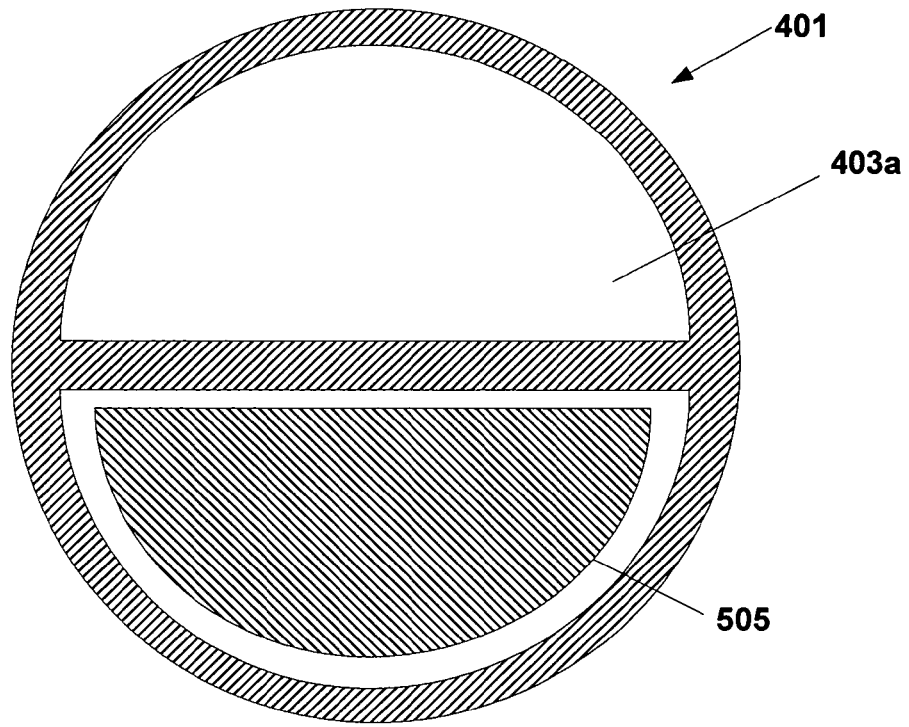
FIG. 5 illustrates a speakerphone with two speakerphone battery compartments including one battery, according to an embodiment.

FIG. 4 illustrates a bottom view of an embodiment of a speakerphone 401 with two speakerphone battery compartments 403a and 403b. FIG. 5 shows a battery 505 in one of the compartments. During the exchange operation one of the compartments may receive the charged battery while the other compartment releases the depleted battery.

In some embodiments, the compartments 403 may be configured to hold batteries that are shaped like a half-disk (or approximately like a half-disk). In some embodiments, the compartments 403 may be configured to hold batteries that are shaped like rectangular parallelepipeds. In yet another embodiment, the compartments 403 may be configured to hold batteries that are disk shaped. A wide variety of embodiments are contemplated for the compartments 403 based on variation of the battery shape.

Figure 6:
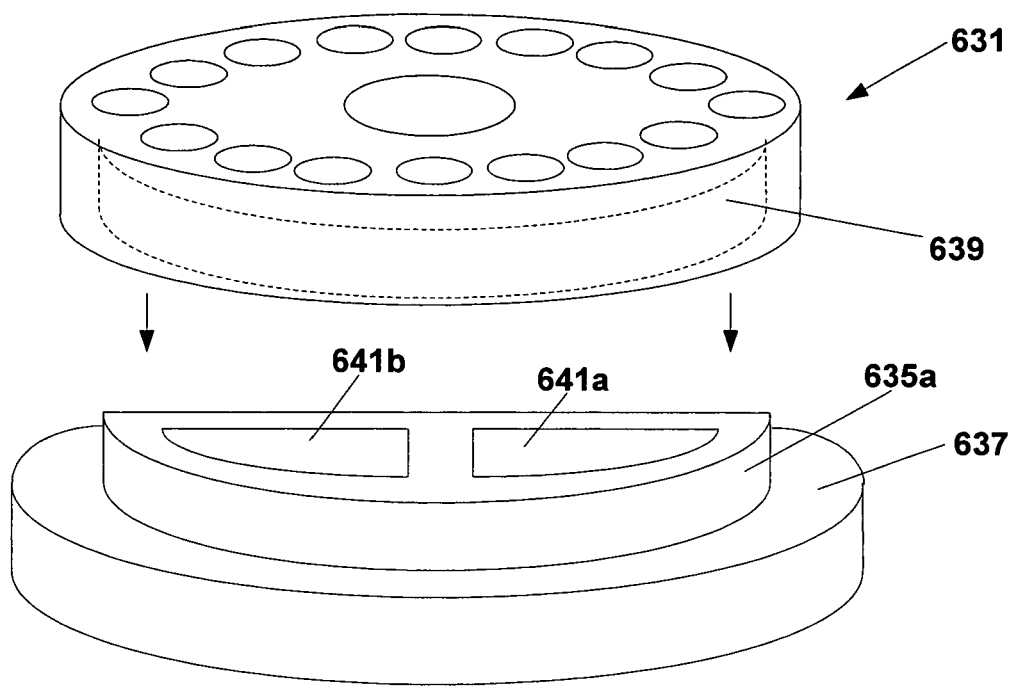
FIG. 6 illustrates a side view of a speakerphone being lowered onto a charging stand; according to an embodiment.
Figure 7:
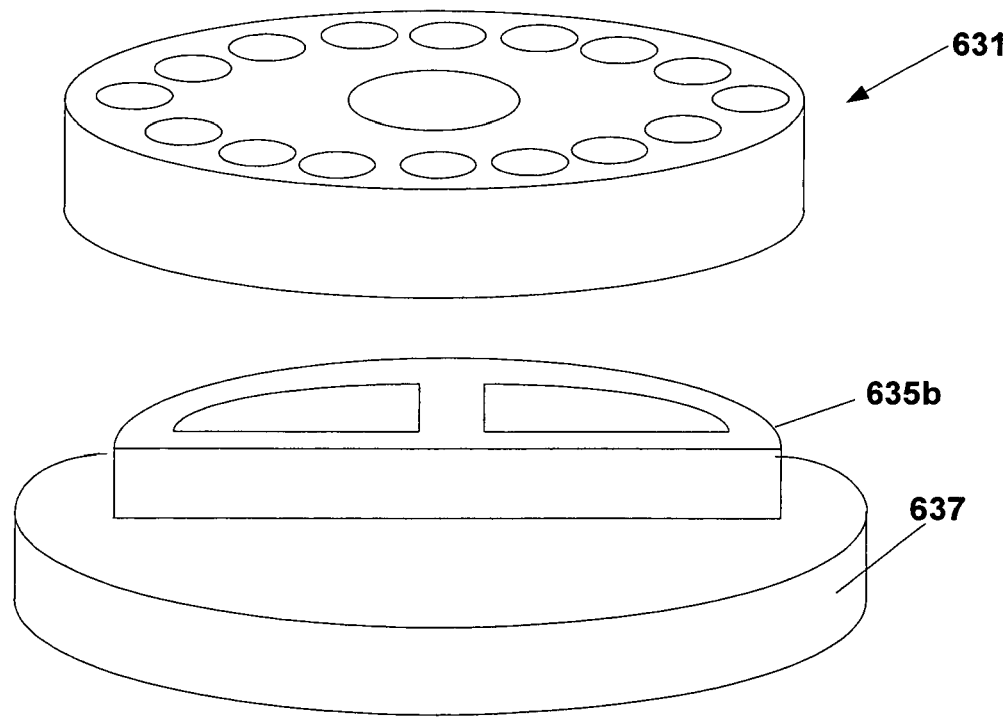
FIG. 7 illustrates a side view of a speakerphone after exchanging a battery, according to an embodiment.

FIG. 6 illustrates a side view of an embodiment of a speakerphone 631 being lowered onto a charging stand 637. FIG. 7 illustrates a side view of an embodiment of a speakerphone 631 after exchanging a battery. A battery 635a may charge on charging stand 637. As the speakerphone 631 is lowered onto the battery 635a, a set of one or more electromagnets in the speakerphone 631 (or alternatively, in the battery 635a) may be turned on. The magnetic field generated by the electromagnets may attract one or more metal structures on the battery 635a (or alternatively, on the speakerphone 631). The metal structures may be plates as suggested by plates 641a and 641b in FIG. 6. The metal plates 641a and 641b may also be the electrical terminals of the battery 635a.

In some embodiments, the electromagnets may stay on to keep the battery 635a coupled to the speakerphone 631. In other embodiments, a second coupling mechanism (e.g., a latch or a permanent magnet) may engage the battery as the electromagnets pull the battery 635a toward the speakerphone 631. After the second coupling mechanism has engaged the battery 635a, the electromagnets may be turned off. In some embodiments, the same set of electromagnets (or alternatively, a different set of electromagnets) may be used to repel the battery 635a to disengage the battery 635a from the second coupling mechanism when desired, e.g., when the battery 635a has depleted after having been used in the speakerphone 631 for a period of time.

In some embodiments, as the battery 635a is coupled to the speakerphone 631, a battery 635b may be decoupled from the speakerphone 631 and mounted onto the charging stand 637.

The battery 635*b* may align with the charging stand 637 as the speakerphone 631 is aligned with the battery 635*a*. A second set of one or more electromagnets on the speakerphone 631 may be used to disengage or repel the battery 635*b* onto the charging stand 637. In some embodiments, the charging stand 637 may have a set of electromagnets to repel or attract batteries toward or away from the speakerphone 631.

As mentioned above, the metal plates 641*a* and 641*b* may be the electrical terminals of the battery 635*a*. In some embodiments, as the speakerphone 631 is lowered onto the battery 635*a* (e.g., in its state of being seated on the charging stand 637), electrical terminals 641*a* and 641*b* may come into physical contact with electrical terminals of the speakerphone 631, and thus, current flow between battery 635*a* and speakerphone 631 may be induced. At least a portion of this current flow may be directed to the electromagnets to create a force of attraction between battery 635*a* and speakerphone 631. The force of attraction may be sufficient to maintain the physical contact between the electrical terminals, and thus, the flow of current. Therefore, a continuous force of attraction which maintains the physical contact is established in response to the initial physical contact.

In some embodiments, the continuous force of attraction may be sufficient to support the weight of the battery 635*a*, and thus, to maintain the physical (and electrical) contact of the battery 635*a* and speakerphone 631 even when the speakerphone is lifted away from the charging stand 637. In some embodiments, the electromagnets may be used to establish a coupling between the battery 635 and the speakerphone 631 for a short period of time until a second coupling mechanism (e.g., a latch or a permanent magnet) has been engaged. The current to the electromagnets may be shut off after the second coupling mechanism has engaged.

Figure 8:
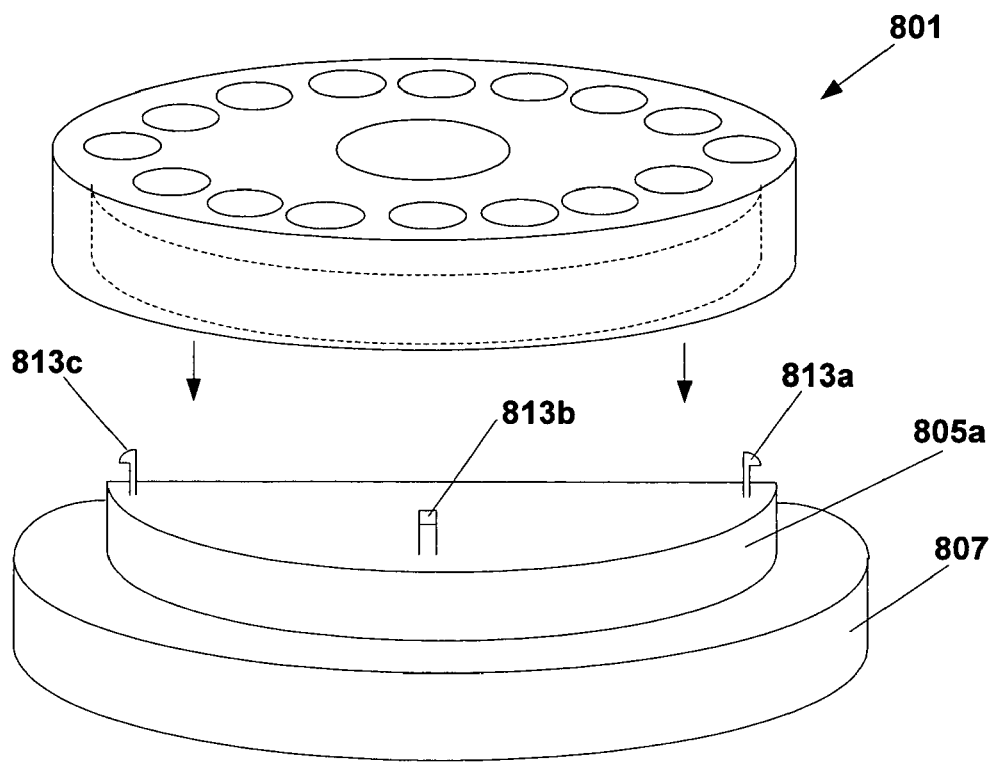
FIG. 8 illustrates a side view of a speakerphone being lowered onto a charging stand including a battery with clips, according to an embodiment.
Figure 9:
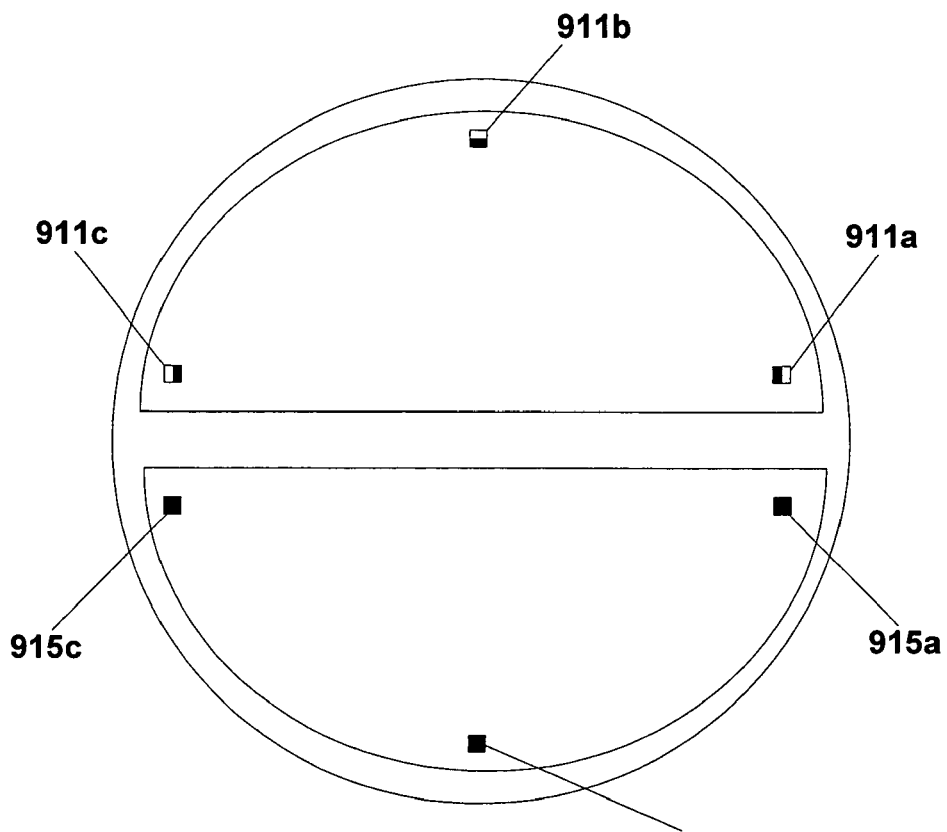
FIG. 9 illustrates a bottom view of a speakerphone that is configured to receive a battery with clips, according to an embodiment.

FIG. 8 illustrates a side view of an embodiment of a speakerphone being lowered onto a charging stand including a battery with clips. FIG. 9 illustrates a bottom view of an embodiment of a speakerphone that is configured to receive a battery with clips. A battery 805*a* may charge on the charging stand 807. The battery 805*a* may have hooked stems 813. Speakerphone 801 may have latches. The speakerphone 801 may control the latches to engage or disengage the hooked stems. FIG. 9 illustrates a bottom view of the speakerphone 801. The latches 911 for a first battery compartment are illustrated in the closed state. The latches 915 for a second battery compartment are illustrated in an open state.

As the speakerphone 801 is lowered onto the battery 805*a*, the latches of the corresponding battery compartment may transition from the open state to the closed state in order to secure connection with the battery 805*a*. In some embodiments, the speakerphone 801 may also release a second battery (e.g., the depleted battery) onto the charging stand by opening the latches of the battery compartment that has held the second battery. In some embodiments, the latches and hooked stems may be reversed (i.e., the hooked stems may be configured on the speakerphone 801 and the latches configured on the batteries). In some embodiments, the latches may be fixed, and the hooked stems may move back and forth to engage or disengage the latches.

FIG. 10 illustrates an embodiment of a method for exchanging a battery on a speakerphone. It should be noted that in various embodiments of the methods described below, one or more of the elements described may be performed concurrently, in a different order than shown, or may be omitted entirely. Other additional elements may also be performed as desired.

At 1001, the speakerphone with a first battery may be placed onto a charging stand with a second battery.

At 1003, the first battery may be disengaged from the speakerphone.

At 1005, the second battery from a charging stand may be coupled to the speakerphone.

Figure 11:
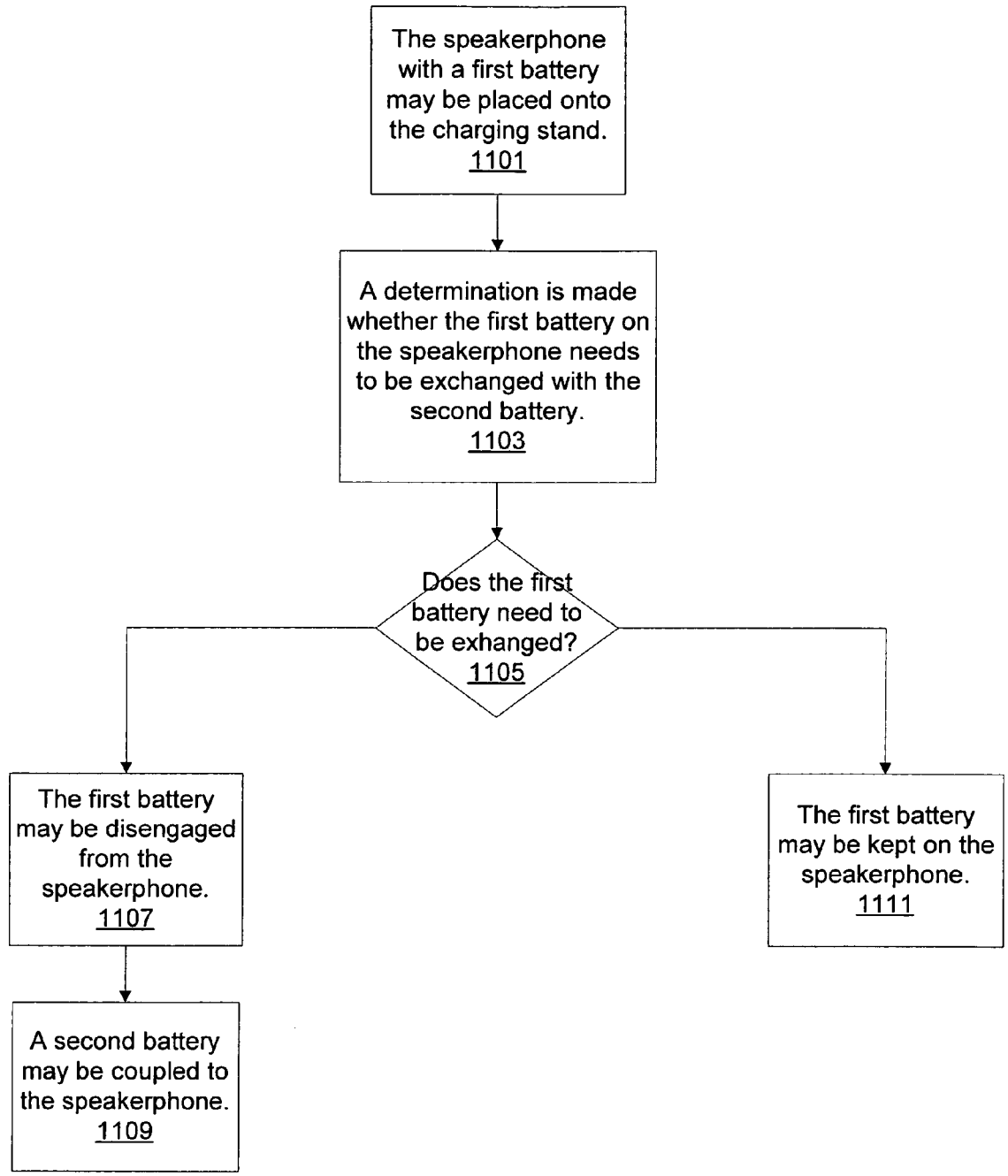
FIG. 11 illustrates of a method for exchanging a battery on a speakerphone by determining if the battery needs to be exchanged, according to an embodiment.

FIG. 11 illustrates an embodiment of a method for exchanging a battery on a speakerphone by determining if the battery needs to be exchanged. It should be noted that in various embodiments of the methods described below, one or more of the elements described may be performed concurrently, in a different order than shown, or may be omitted entirely. Other additional elements may also be performed as desired.

At 1101, the speakerphone with a first battery may be placed onto the charging stand. In some embodiments, the speakerphone may indicate to a user that the battery is low on power to prompt the user to place the speakerphone on the charging stand or the speakerphone may be periodically placed on the charging stand.

At 1103, the speakerphone or the charging stand may determine if the first battery on the speakerphone needs to be exchanged with the second battery. For example, the speakerphone or charging stand may determine that the first battery needs to be exchanged if the charge of the first battery is below a predetermined level. Other criteria are also contemplated.

If the first battery on the speakerphone needs to be exchanged, at 1107, the first battery may be disengaged from the speakerphone, and at 1109, a second battery may be coupled to the speakerphone. In some embodiments, the speakerphone and/or charging stand automatically exchanges the battery whenever the speakerphone is placed on the charging stand (i.e., it assumes the battery needs to be exchanged).

If the first battery on the speakerphone does not need to be exchanged, at 1111, the first battery may be kept on the speakerphone. Indicator lights on the charging stand or speakerphone may indicate to the user that a battery exchange is not needed.

Embodiments of these methods may be implemented by program instructions stored in a memory medium or carrier medium. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, the computer system may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. An apparatus, comprising:
    a charging stand; and
    a first battery releasably coupled to the charging stand;
    wherein the charging stand is configured to automatically decouple a second battery from a speakerphone while the speakerphone is engaged with the charging stand, and
    wherein the charging stand is configured to release and automatically couple the first battery to the speakerphone while the speakerphone is engaged with the charging stand; wherein the charging stand further comprises one or more rollers, and wherein the one or more rollers in the charging stand are configured to move the first battery into engagement with the speakerphone.

2. The apparatus of claim 1, wherein the first battery is configured to engage the speakerphone through one or more clips or magnets.

3. The apparatus of claim 1, wherein the charging stand or speakerphone is configured to determine if the second battery coupled to the speakerphone needs to be exchanged with the first battery.

4. The apparatus of claim 1, wherein the charging stand is configured to not release the second battery until the charging stand receives the first battery.

5. The apparatus of claim 1, wherein the speakerphone is configured to engage the charging stand through one or more of the first battery and the second battery.

6. An apparatus, comprising:
    a speakerphone; and
    a first battery releasably coupled to the speakerphone;
    wherein the speakerphone is configured to automatically exchange the first battery with a second battery coupled to a charging stand when the speakerphone engages the charging stand; wherein the charging stand further comprises one or more rollers, and wherein the one or more rollers in the charging stand are configured to move the second battery into engagement with the speakerphone.

7. The apparatus of claim 6, wherein the second battery is configured to engage the speakerphone through one or more clips or magnets.

8. The apparatus of claim 6, wherein the charging stand or speakerphone is configured to determine if the first battery releasably coupled to the speakerphone needs to be exchanged with the second battery.

9. The apparatus of claim 6, wherein the speakerphone is configured to not release the first battery until the speakerphone receives the second battery.

10. A method, comprising:
    placing a speakerphone with a first battery onto a charging stand with a second battery;
    automatically disengaging the first battery from the speakerphone while the speakerphone engages the charging stand; and
    automatically coupling the second battery to the speakerphone while the speakerphone engages the charging stand; wherein the charging stand further comprises one or more rollers, and wherein the one or more rollers in the charging stand are configured to move the second battery into engagement with the speakerphone.

11. The method of claim 10, further comprising determining if the second battery on the speakerphone needs to be exchanged with the first battery.

12. The method of claim 10, wherein the second battery engages the speakerphone through one or more magnets.

13. The method of claim 10, wherein the second battery engages the speakerphone through one or more clips.

14. The method of claim 10, wherein the charging stand couples the second battery to the speakerphone only after the charging stand receives the first battery from the speakerphone.

15. The apparatus of claim 1, wherein receiving the second battery from the speakerphone comprises the charging stand decoupling the second battery from the speakerphone.

16. The apparatus of claim 1, wherein releasing the first battery to the speakerphone comprises the charging stand coupling the first battery to the speakerphone.

17. The apparatus of claim 6, wherein the speakerphone is configured to automatically decouple the first battery from the speakerphone and couple the second battery to the speakerphone when the speakerphone engages the charging stand.

* * * * *

UNITED STATES PATENT AND TRADEMARK OFFICE
CERTIFICATE OF CORRECTION

PATENT NO. : 7,602,141 B2 Page 1 of 1
APPLICATION NO. : 11/252225
DATED : October 13, 2009
INVENTOR(S) : Kenoyer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 631 days.

Signed and Sealed this

Fifth Day of October, 2010

David J. Kappos
*Director of the United States Patent and Trademark Office*